US008004622B2

(12) United States Patent
Schultz et al.

(10) Patent No.: US 8,004,622 B2
(45) Date of Patent: Aug. 23, 2011

(54) EMBEDDED STEREOSCOPIC 3D DISPLAY AND 2D DISPLAY FILM STACK

(75) Inventors: John C. Schultz, Afton, MN (US);
Michael J. Sykora, Deer Park, WI (US);
Martin Kristoffersen, Maplewood, MN (US); Kathy L. Hagen, Stillwater, MN (US); Glenn E. Casner, Woodbury, MN (US); Bonnie W. Albrecht, Lake Elmo, MN (US); Robert L. Brott, Woodbury, MN (US); Scott E. Brigham, Maplewood, MN (US); John C. Nelson, The Sea Ranch, CA (US)

(73) Assignee: 3M Innovative Properties Company, Saint Paul, MN (US)

( * ) Notice: Subject to any disclaimer, the term of this patent is extended or adjusted under 35 U.S.C. 154(b) by 207 days.

(21) Appl. No.: 12/241,502

(22) Filed: Sep. 30, 2008

(65) Prior Publication Data
US 2009/0091667 A1 Apr. 9, 2009

Related U.S. Application Data

(60) Provisional application No. 60/977,482, filed on Oct. 4, 2007.

(51) Int. Cl.
*G02F 1/1335* (2006.01)
(52) U.S. Cl. .......................................................... 349/15
(58) Field of Classification Search ........................ None
See application file for complete search history.

(56) References Cited

U.S. PATENT DOCUMENTS

| 5,801,705 | A | 9/1998 | Kato et al. | |
|---|---|---|---|---|
| 5,897,184 | A * | 4/1999 | Eichenlaub et al. | 349/64 |
| 7,173,760 | B2 | 2/2007 | Adachi et al. | |
| 7,210,836 | B2 * | 5/2007 | Sasagawa et al. | 362/606 |
| 7,477,331 | B2 * | 1/2009 | Lin et al. | 349/15 |
| 7,530,721 | B2 | 5/2009 | Mi et al. | |
| 2002/0054434 | A1 | 5/2002 | Florczak et al. | |
| 2005/0030301 | A1 | 2/2005 | Harrold et al. | |
| 2005/0052750 | A1 | 3/2005 | King et al. | |
| 2005/0276071 | A1 | 12/2005 | Sasagawa et al. | |
| 2006/0023143 | A1 | 2/2006 | Lee | |

FOREIGN PATENT DOCUMENTS

| JP | 10-268805 | 10/1998 |
|---|---|---|
| JP | 2003-185966 | 7/2003 |
| JP | 2004-109258 | 4/2004 |
| JP | 2004-153489 | 5/2004 |

OTHER PUBLICATIONS

Ishikawa et al. "New Design for a Highly Collimating Turning Film," Eastman Kodak Company, SID 06 Digest, pp. 514-517, 2006.

* cited by examiner

*Primary Examiner* — Sarah Hahm

(57) ABSTRACT

An LCD device with 3D and 2D sections. The device includes an LCD panel, a light guide with a backlight, and an embedded 3D-2D film stack positioned between the LCD panel and the light guide. The 3D and 2D sections provide for simultaneously viewing visual content in 3D and 2D formats. The device can also include a frame providing a barrier between the 3D and 2D sections and can include other features to enhance the display.

9 Claims, 10 Drawing Sheets

EMBEDDED STEREOSCOPIC 3D DISPLAY AND 2D DISPLAY FILM STACK

CROSS REFERENCE TO RELATED APPLICATION

This application claims the benefit of U.S. Provisional Application No. 60/977,482, filed Oct. 4, 2007, the disclosure of which is incorporated by reference herein in its entirety.

FIELD

The present disclosure relates to a backlit liquid crystal display apparatus and particularly to displaying stereo 3D images with 2D images.

BACKGROUND

A stereoscopic 3D display usually presents an observer with images with parallax from individual right and left eye viewpoints. There are two methods of providing the two eyes of the observer with the parallax images in a time sequential manner. In one method, the observer utilizes a pair of shutter or 3D glasses which transmit or block light from the viewer's eyes in synchronization with alternating the left/right image display. Similarly, in another method, right eye and left eye viewpoints are alternatively displayed and presented to the respective eyes of the observer but without the use of 3D glasses. This second method is referred to as autostereoscopic and is sometimes desirable for stereo 3D viewing because separate glasses are not needed though there is limited permissible head motion.

A liquid crystal display (LCD) is a sample and hold display device such that the image at any point or pixel of the display is stable until that pixel is updated at the next image refresh time, typically 1/60 of a second or faster. In such a sample and hold system, displaying different images, specifically displaying alternating left and right images for an autostereoscopic display, requires careful timing sequencing of the light sources so that, for example, the left eye image light source is not on during the display of data for the right eye and vice versa.

BRIEF SUMMARY

The present disclosure relates to a backlit liquid crystal display apparatus and particularly to displaying stereo 3D images with 2D images using an embedded 3D film stack.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "autostereoscopic" refers to displaying three-dimensional images that can be viewed without the use of special headgear or glasses on the part of the user or viewer. These methods produce depth perception for the viewer even though the image is produced by a flat device. The term stereoscopic 3D incorporates the field of autostereoscopic devices but also includes the stereoscopic 3D display case in which special headgear, typically shutter glasses, are need to see stereoscopic 3D from a flat device.

Figure 1:
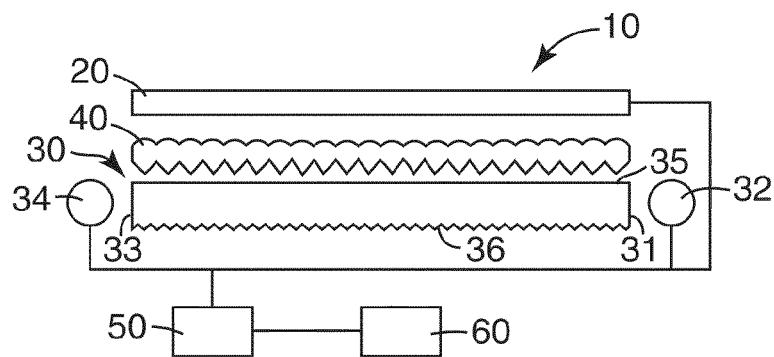
FIG. 1 is a schematic side view of an illustrative display apparatus.

FIG. 1 is a schematic side view of an illustrative display apparatus 10. The display apparatus includes a liquid crystal display panel 20 and a backlight 30 positioned to provide light to the liquid crystal display panel 20. The backlight 30 includes a right eye image solid state light source 32 or plurality of first light sources 32, and a left eye image solid state light source 34 or plurality of second light sources 34, capable of being modulated between the right eye image solid state light source 32 and the left eye image solid state light source 34 at a rate of, in many embodiments, at least 90 Hertz. A double sided prism film 40 is disposed between the liquid crystal display panel 20 and the backlight 30.

The liquid crystal display panel 20 and/or backlight 30 can have any useful shape or configuration. In many embodiments, the liquid crystal display panel 20 and backlight 30 has a square or rectangular shape. However, in some embodiments, the liquid crystal display panel 20 and/or backlight 30 has more than four sides or is a curved shape. While the present disclosure is directed to any stereoscopic 3D backlight including those requiring shutter glasses or more than a single lightguide and associated liquid crystal display panel, the present disclosure is particularly useful for autostereoscopic displays.

A synchronization driving element 50 is electrically connected to the backlight 30 plurality of first and second light sources 32, 34 and the liquid crystal display panel 20. The synchronization driving element 50 synchronizes activation and deactivation (i.e., modulation) of the right eye image solid state light source 32 and the left eye image solid state light source 34 as image frames are provided at a rate of, in many embodiments, 90 frames per second or greater to the liquid crystal display panel 20 to produce a flicker-free still image sequence, video stream or rendered computer graphics. An image (e.g., video or computer rendered graphics) source 60 is connected to the synchronization driving element 50 and provides the images frames (e.g., right eye images and left eye images) to the liquid crystal display panel 20.

The liquid crystal display panel 20 can be any useful transmissive liquid crystal display panel. In many embodiments, liquid crystal display panel 20 has a frame response time of less than 16 milliseconds, or less than 10 milliseconds, or less than 5 milliseconds. Commercially available transmissive liquid crystal display panels having a frame response time of less than 10 milliseconds, or less than 5 milliseconds, or less than 3 milliseconds, are for example Toshiba Matsushita Display's (TMD) optically compensated bend (OCB) mode panel LTA090A220F (Toshiba Matsushita Display Technology Co., Ltd., Japan).

The backlight 30 can be any useful backlight that can be modulated between a right eye image solid state light source 32 and left eye image solid state light source 34 at a rate of, in many embodiments, at least 90 Hertz, or 100 Hertz, or 110 Hertz, or 120 Hertz, or greater than 120 Hertz.

The illustrated backlight 30 includes a first side 31 or first light input surface 31 adjacent to the plurality of first light sources 32 or right eye image solid state light source 32 and an opposing second side 33 or second light input surface 33 adjacent to the plurality of second light sources 34 or left eye image solid state light source 34. A first surface 36 extends between the first side 31 and second side 33, and a second surface 35, opposite the first surface 36, extends between the first side 31 and second side 33. The first surface 36 substantially re-directs (e.g., reflects, extracts, and the like) light and the second surface 35 substantially transmits light. In many embodiments, a highly reflective surface is on or adjacent to the first surface 36 to assist in re-directing light out through the second surface 35.

In many embodiments, the first surface 36 includes a plurality of extraction elements such as, for example, linear prism or lenticular features as shown. In many embodiments, the linear prism or lenticular features can extend in a direction parallel to the first side 31 and second side 33 or parallel to the linear prism and lenticular features of the double sided prism film 40. In some embodiments, the linear prism or lenticular features are not parallel to the first side 31 or second side 33.

The solid state light sources can be any useful solid state light source that can be modulated at a rate of, for example, at least 90 Hertz. In many embodiments, the solid state light source is a plurality of light emitting diodes such as, for example, Nichia NSSW020B (Nichia Chemical Industries, Ltd., Japan). In other embodiments, the solid state light source is a plurality of laser diodes or organic light emitting diodes (i.e., OLEDs). The solid state light sources can emit any number of visible light wavelengths such as red, blue, and/or green, or range or combinations of wavelengths to produce, for example, white light. The backlight can be a single layer of optically clear material with light sources at both ends or two (or more) layers of optically clear material with a light source per layer which preferentially extract light in a desired direction for each layer.

The double sided prism film 40 can be any useful prism film having a linear lenticular structure on a first side and a linear prismatic structure on an opposing side. The linear lenticular structure and the linear prism structure are parallel. The double sided prism film 40 transmits light from the scanning backlight to the liquid crystal display panel 20 at the proper angles such that a viewer perceives depth in the displayed image. Useful, double sided prism films are described in United States Patent Publication Nos. 2005/0052750 and 2005/0276071, which are incorporated herein to the extent they do not conflict with the present disclosure.

The image source 60 can be any useful image source capable of providing images frames (e.g., right eye images and left eye images) such as, for example, a video source or a computer rendered graphic source. In many embodiments, the video source can provide image frames from 50 to 60 Hertz or greater. In many embodiments, the computer rendered graphic source can provide image frames from 100 to 120 Hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The video source can provide video content. The video source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 50 can include any useful driving element providing synchronizing activation and deactivation (i.e., modulation) of the right eye image solid state light source 32 and the left eye image solid state light source 34 with image frames provided at a rate of, for example, 90 frames per second or greater to the liquid crystal display panel 20 to produce flicker-free video or rendered computer graphics. The synchronization driving element 50 can include a video interface such as, for example, a Westar VP-7 video adaptor (Westar Display Technologies, Inc., St. Charles, Mo.) coupled to custom solid state light source drive electronics.

Figure 2A:
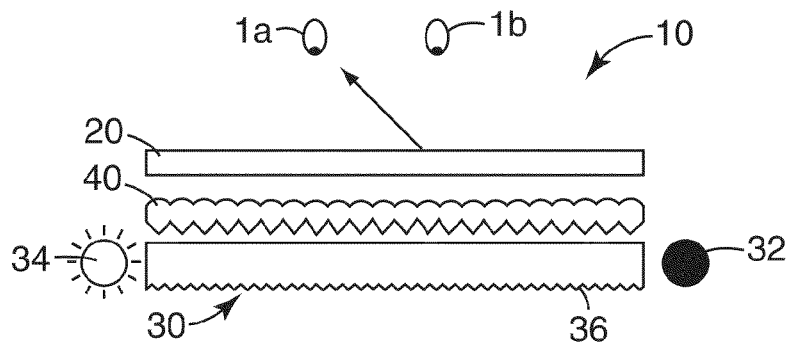
FIG. 2A and FIG. 2B are schematic side views of an illustrative display apparatus in operation.
Figure 2B:
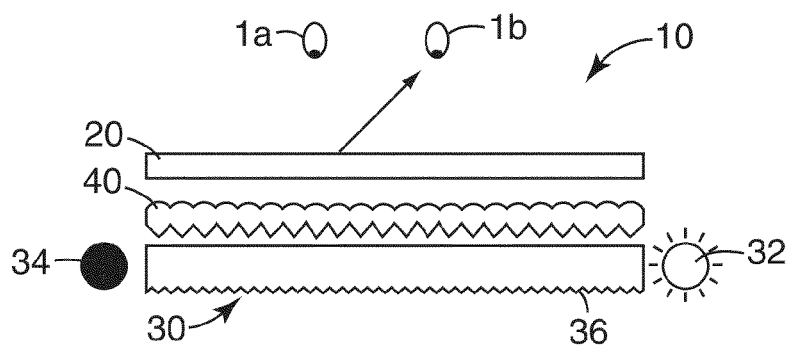

FIG. 2A and FIG. 2B are schematic side views of an illustrative display apparatus 10 in operation. In FIG. 2A the left eye image solid state light source 34 (i.e., plurality of second light sources 34) is illuminated and the right eye image solid state light source 32 (i.e., plurality of first light sources 32) is not illuminated. In this state, the light emitted from the left eye image solid state light source 34 transmits through the backlight 30, through the double sided prism sheet 40, and liquid crystal panel 20 providing a left eye image directed toward the left eye 1a of an viewer or observer. In FIG. 2B the right eye image solid state light source 32 is illuminated and the left eye image solid state light source 34 is not illuminated. In this state, the light emitted from the right eye solid state light source 32 transmits through the backlight 30, through the double sided prism sheet 40, and liquid crystal panel 20 providing a right eye image directed toward the right eye 1b of an viewer or observer. It is understood that while the right eye solid state light source 32 is located on the right side of the light guide and the left eye image solid state light source 34 is located on the left side of the light guide, is some embodiments, the right eye solid state light source 32 is located on the left side of the light guide and the left eye image solid state light source 34 is located on the right side of the light guide.

The light sources 32, 34 can be air coupled or index matched to the backlight light guide. For example, a packaged light source device (e.g., LED) can be edge-coupled without index matching material into the light guide. Alternatively, packaged or bare die LEDs can be index matched and/or encapsulated in the edge of the light guide for increased efficiency. This feature may include additional optical features, e.g., injection wedge shapes, on the ends of the light guide to efficiently transport the input light. The LEDs can be alternatively embedded in the edge or side 31, 33 of the light guide with appropriate features to efficiently collect and collimate the LED light into TIR (i.e., total internal reflection) modes of the light guide.

Liquid crystal display panels 20 have a refresh or image update rate that is variable, but for the purposes of this example, a 60 Hz refresh rate is presumed. This means that a new image is presented to the viewer every 1/60 second or 16.67 milliseconds (msec). In the 3D system this means that at time t=0 (zero) the right image of frame one is presented. At time t=16.67 msec the left image of frame one is presented. At time t=2*16.67 msec the right image of frame two is presented. At time t=3*16.67 msec the left image of frame two is presented, and this process is thus repeated. The effective frame rate is half that of a normal imaging system because for each image a left eye and right eye view of that image is presented.

In this example, turning the first plurality of light sources on to light the right (or left) image at time t=0 provides light to the right (or left) image, respectively. At time t=16.67 msec the second image left or right, starts to be put in place. This image replaces the "time t=0 image" from the top of the LCD panel to the bottom of the LCD, which takes 16.67 msec to complete in this example. Non-scanned solutions turn off all the first plurality of light sources and then turn on all the second plurality of light sources sometime during this transition.

Providing at least 45 left eye images and at least 45 right eye images (alternating between right eye and left eye images and the images are possibly a repeat of the previous image pair) to a viewer per second provides a flicker-free 3D image to the viewer. Accordingly, displaying different right and left viewpoint image pairs from computer rendered images or images acquired from still image cameras or video image cameras, when displayed in synchronization with the switching of the light sources 32 and 34, enables the viewer to visually fuse the two different images, creating the perception of depth from the flat panel display. A limitation of this visually flicker-free operation is that, as discussed above, the backlight should not be on until the new image that is being displayed on the liquid crystal display panel has stabilized; otherwise cross-talk and a poor stereoscopic image will be perceived.

The backlight 30 and associated light sources 32, 34 described herein can be very thin (thickness or diameter) such as, for example, less then 5 millimeters, or from 0.25 to 5 millimeters, or from 0.5 to 4 millimeters, or from 0.5 to 2 millimeters.

Embedded 3D-2D Film Stack

An embodiment includes an article incorporating a 3D film, such as the double sided prism film described and identified above, incorporated into an autostereoscopic 3D display as part of the backlight for an embedded 2D and 3D display. "Embedded" in this case means that the 2D portion(s) of the display and the 3D portion(s) of the display use a common backlight comprising a 3D backlight using 2-sided 3D film and that the 2D portions of this display use the same backlight with the addition of, for example, diffusers, reflective polarizers, brightness enhancement film, turning film, gain enhancement diffusers, and possibly other films used between the backlight and an LCD panel. An advantage of this embodiment is that a conventional optical stack of films will work with the 3D backlight and that the creation of the 2D portions of the backlight does not degrade the performance of the 3D portion(s) of the display. Also, this combination of 3D and 2D displays can produce a visually appealing display with autostereoscopic 3D in particular regions for conspicuity, improved human response time, and generally a more immersive type display.

One particular embodiment includes an embedded or combined 2D and 3D display unit as part of an automobile dashboard. Visually the 3D portion of the display is compelling because the otherwise flat display is made to have apparent depth. Some automobile makers attempt to provide a 3D effect in the instrument cluster by making, for example, the speedometer number be a transparent lightguide with a needle mounted in front of or behind the lightguide. This technique is a static feature or simply changing 3D effect compared to the autostereoscopic 3D effect demonstrated with the embedded solution.

Figure 3:
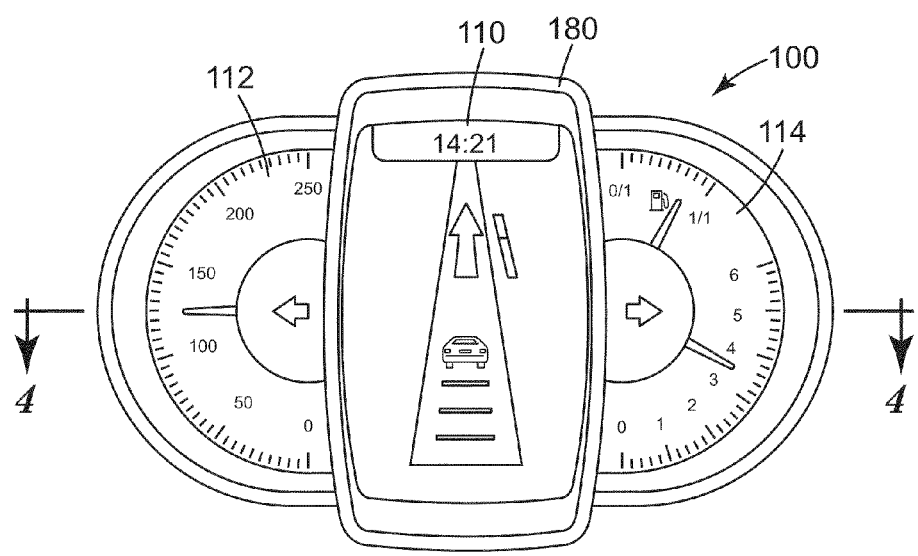
FIG. 3 is a diagram illustrating a 3D-2D display for an automobile dashboard.

An illustrative example is shown in FIG. 3 for an embedded automotive instrument cluster 100. The center autostereoscopic 3D region 110 is embedded in simple gauge oriented 2D regions 112, 114. The left 112 and right 114 zones in FIG. 3 are 2D displays providing, in this example, instrument readings for an automobile.

Figure 4:
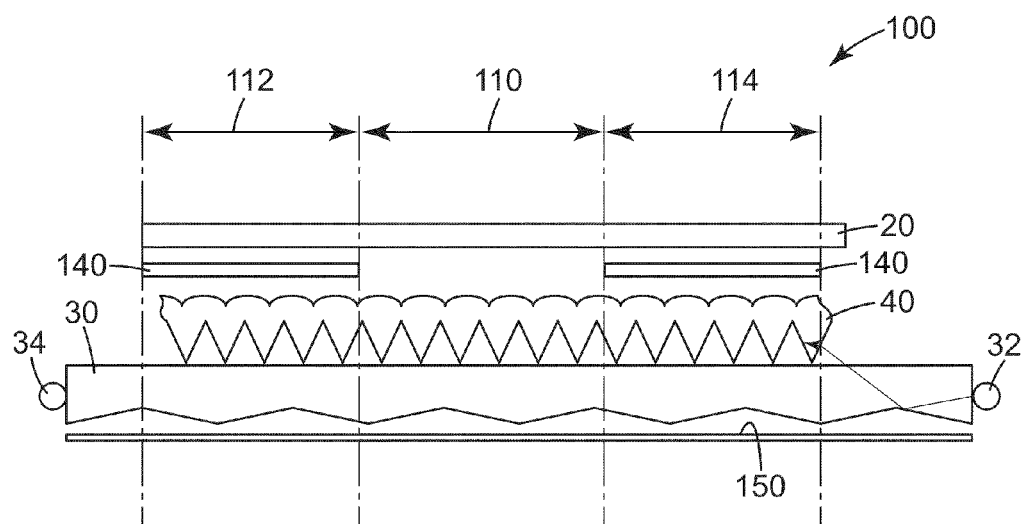
FIG. 4 is a cross sectional side view of a 3D-2D display.

The optical paths for the 3D display region 110 and the 2D display regions 112, 114 are shown in cross-section in FIG. 4 taken along line 4-4 of FIG. 3. The film stack may be composed of various combinations of diffuser, reflective polarizer, turning film, brightness enhancement film, gain diffuser and other films typically used to enhance viewing angle, brightness, efficiency, or other desirable properties in a display.

The stereoscopic 3D display and 2D display 100 includes, for example, a liquid crystal display panel 20, drive electronics configured to drive the liquid crystal display panel with alternating left eye and right eye images (shown in FIG. 1), a light guide or backlight 30 positioned to provide light to the liquid crystal display 20, and an embedded 3D film 40 positioned between the liquid crystal display panel 20 and the light guide 30. In many embodiments, the embedded 3D film 40 is coextensive with the liquid crystal display panel 20, as illustrated. The display 100 includes a 3D section 110 providing for visual information in a 3D format and a 2D section 112, 114 providing for visual information in a 2D format. Light sources 32, 34 such as, for example, light emitting diodes (LEDs) are positioned on opposing sides of the light guide 30, as described above. A light reflector 150 can be placed on or adjacent a surface of the light guide 30 opposite the liquid crystal display panel.

A diffuser film 140 is positioned between the liquid crystal display panel 20 and the embedded 3D film 40. The diffuser film 140 scatters light and disrupts angular orientation of light passing through the 2D section 112, 114 providing for visual information in a 2D format. However, this construction provides a stereoscopic 3D display and 2D display 100 having a uniform brightness.

3D-2D Display Transition Zone

An embodiment includes a display with stereoscopic 3D content in one section and 2D content in other sections with a narrow transition zone between the 2D and 3D sections, possibly made using a physical barrier between the 2D and 3D sections. In some embodiments, the 3D film that creates the 3D effect is covered over in the 2D sections by a diffuser stack or diffuser film. The 2D-3D sections are split by the edge of the diffuser stack, which is a very narrow zone, perhaps one pixel wide. This area can be covered over by a very narrow bezel to separate the two sections and assist the viewer in transition between the two views.

One particular embodiment includes a 2D-3D-2D display with one backlight and one LCD display that shows 3D content only in the center section and 2D content in sections on either side of the 3D section. The 3D film that transmits light to one or the other eye to allow a 3D effect is attached to a rigid film frame (e.g., metal film frame) in the center of the display with other turning films attached to the rigid film frame on either side. Alternatively, there can be the one 3D film all along the bottom of the frame. These films are situated on top of a single backlight with a minimum air gap between the light guide and the 3D films. The light guide is illuminated on the left and right sides by several side-emitting LEDs. The left and right side LEDs are alternately turned on in synchronization with their corresponding left or right image, as described above. The 3D film transmits light from the left LEDs into the viewer's left eye while the left image is presented on the LCD display. Similarly, the 3D film transmits light from the right LEDs into the viewer's right eye while the right image is presented on the LCD display.

The 2D sections provide two identical images on the LCD panel. The 3D section provides two different images from two different viewpoints on the LCD panel at two different times, generating the 3D effect. The 2D sections also have one or more diffuser films between the LCD panel and the turning film to improve the view angle performance and uniformity of the 2D sections and to minimize cosmetic blemishes. Thus, the 2D sections will not show stereoscopic 3D.

Figure 5:
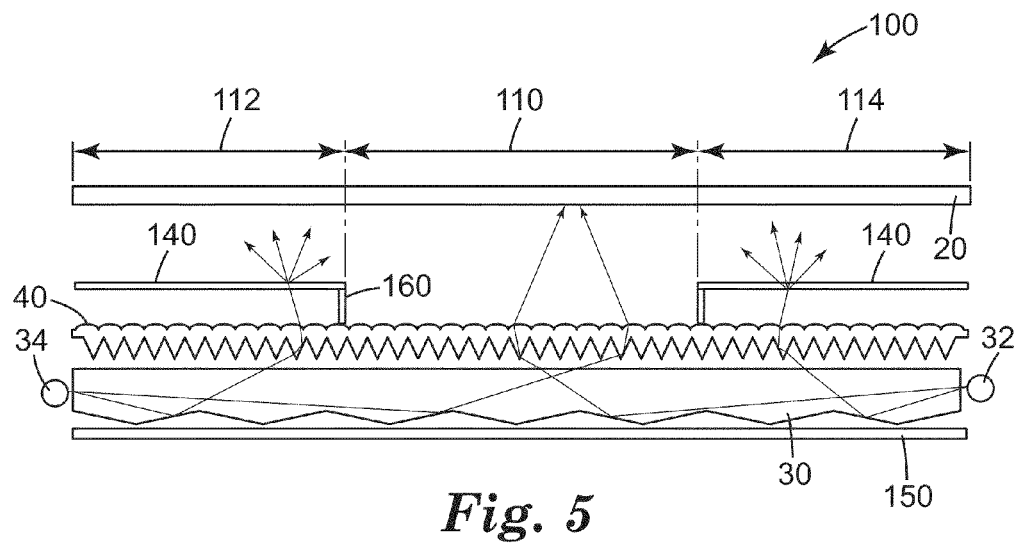
FIG. 5 is a cross sectional side view of a 3D-2D display with barriers between the 3D and 2D zones.
Figure 6:
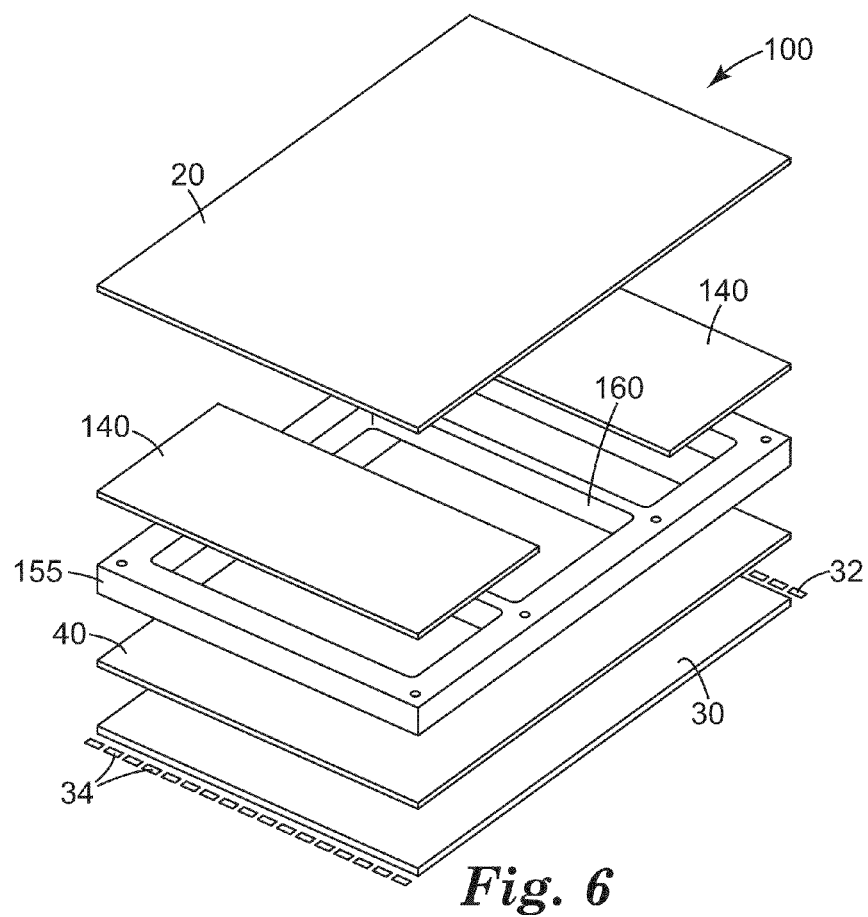
FIG. 6 is a perspective view of a 3D-2D display with barriers between the 3D and 2D zones.

If the diffuser films are separated from the turning film with a large air gap, then a physical barrier can be between the 2D and 3D sections to prevent stray light from the 2D from entering the 3D area and contaminating the directional 3D light. If the diffuser films are in close proximity to the 3D film, a physical barrier may not be needed because the 2D scattered light is extracted through the display very quickly and will be less likely to bounce into the 3D zone. FIG. 5 is a cross sectional side view of a 3D-2D display in this embodiment with barriers between the 3D and 2D zones, and FIG. 6 is a perspective view of this embodiment, which also shows other stack components for a 2D-3D-2D display. Many of the elements of FIG. 5 are described in relation to FIG. 4 above. FIG. 5 additionally illustrates the physical barrier 160 that reduces or prevents light passing between the 3D section 110 and a 2D sections 112, 114. FIG. 5 also illustrates light ray tracing where each light source has a light ray that passes through one of the 2D sections 112, 114 and another light ray passing through the 3D section 110.

FIG. 6 is an exploded perspective view of the stereoscopic 3D display and 2D display 100. Many of the elements of FIG. 6 are described in relation to FIG. 4 and FIG. 5 above. FIG. 6 illustrates one embodiment of a frame 155 providing a barrier layer 160.

The frame 155 can be formed of any useful material and in many embodiments is a rigid material such as, for example, aluminum. The illustrated frame 155 includes a center section, a left section adjacent a first side of the center section, and a right section adjacent a second side of the center section opposite the first side, wherein the center section corresponds with the 3D section 110 and wherein the left section corresponds to a 2D section 112 and right section correspond with the 2D section 114.

Figure 7:
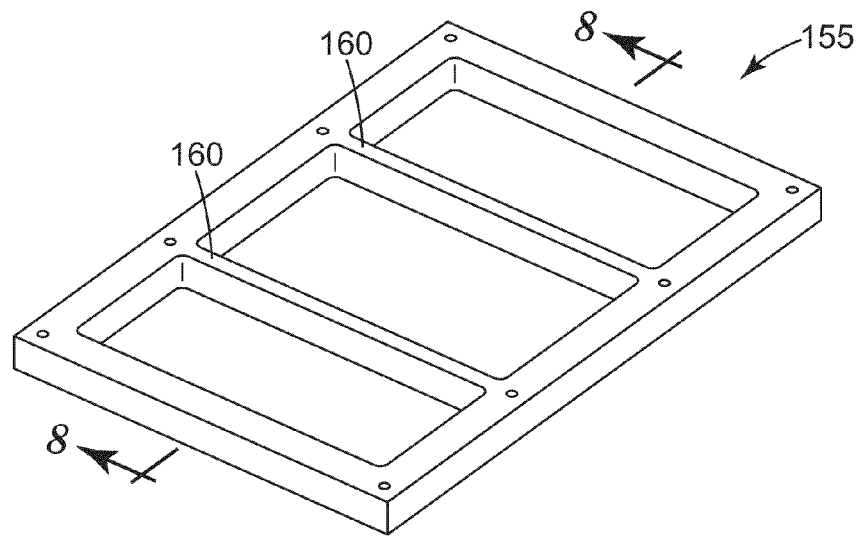
FIG. 7 is a perspective view of a frame for providing barriers between 3D and 2D sections in a 3D-2D display.
Figure 8:
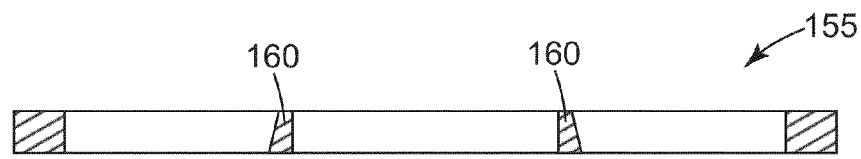
FIG. 8 is cross-sectional view of the frame of FIG. 7 taken along line 8-8 that provides barriers between 3D and 2D sections in a 3D-2D display and illustrating bezels in the barriers.

One particular embodiment of a film frame for the display has about a ½ inch gap between the LCD and the diffuser so that the 3D film is spaced from the LCD panel to prevent moire visual effects. A narrow metal barrier has been included between the 2D and 3D areas lined with specular reflective material to reflect light within the 2D areas in order to prevent it from being absorbed and to maintain the 2D areas brighter. The light in the 3D section is also contained between the barriers. The frame can be composed of aluminum, for example. This film frame design for this embodiment is shown in FIG. 7, which is perspective view of the frame, and in FIG. 8, is a side view of the frame 155 with the physical barriers 160 taken along line 8-8 of FIG. 7.

The width of the bezel 180 (see FIG. 3) on top of the LCD 20 must be at least as wide as the frame barrier 160 separating the 2D 112, 114 and 3D sections 110. To minimize the width of the bezel 180, a wedge shape can be made in the frame 155, which is wider at the bottom and narrower at the top of the bezel. The angle of the wedge can be located on the 2D sides of the frame; the 3D edges can be vertical because they are visible to the viewer. The 2D area has diffusers 140 to hide the shape of the wedge from the viewer.

The transition zone between the 2D sections 112, 114 and 3D section 110 is a narrow area at the inner edges of the diffuser film 140. This transition zone can be covered by a narrow bezel 180 located above the LCD panel 20. The bezel

180 will also cover the narrowest area of the film frame 155 and any other portions of the LCD 20 that are not needed.

Techniques to Avoid Depth Cue Conflict in 3D Display

The following description illustrates how to avoid some commonly occurring depth cue conflicts that can occur with 3D display systems. This disclosure of techniques to avoid depth cue conflict in 3D display is applicable to any 3D display in general. In some embodiments a good 3D display is obtained when content is designed to avoid conflicting depth cues. Such content includes stereoscopic content such that the disparity depth cue content that does not conflict with the visual depth of the display bezel visual depth (see FIG. 3, reference numeral 180). For example, if the disparity depth cue provides a visual response that is not at the same depth as the display bezel for portions of the stereoscopic image near or adjacent to the display bezel, the viewer will have difficulty seeing the stereoscopic content. In another example, the disparity depth cue and/or the bezel visual depth may conflict with a second depth cue (occlusion) producing a conflicting visual interpretation. While this example describes the effects of a display bezel, the same effects will be of concern wherever a physical depth touches the stereoscopic display area such as the edges of the display or displays tiled together.

Another depth cue conflict that often occurs with stereoscopic displays results from the common stereoscopic content generation practice that leads to the content being perceived as a limited number of discrete depth layers, referred to as a "cardboarding" effect. For example, when stereoscopic content is generated that in the real world would cross numerous depth layers, designers often will take stimulus generation shortcuts that lead to the content component being perceived as a single depth layer in terms of parallax whereas other depth cues such as linear perspective or texture gradient suggest that the same component should. Such depth cue conflicts can be avoided by generating stereoscopic content using actual geometries whenever possible, for example using 3D rendering programs.

Another depth cue conflict that can be very subtle, but potentially devastating in terms of its impact on a viewer's ability to fuse stereoscopic content, results from surfaces in the content lacking sufficient features for the visual system to determine relative disparity. Thus, one component of the present disclosure illustrates how to design stereoscopic content to effectively utilize disparity to confer a sense of depth to a viewer by designing all stereoscopic content with sufficient features to allow the viewer's system to effectively discern disparity information.

Figure 9:
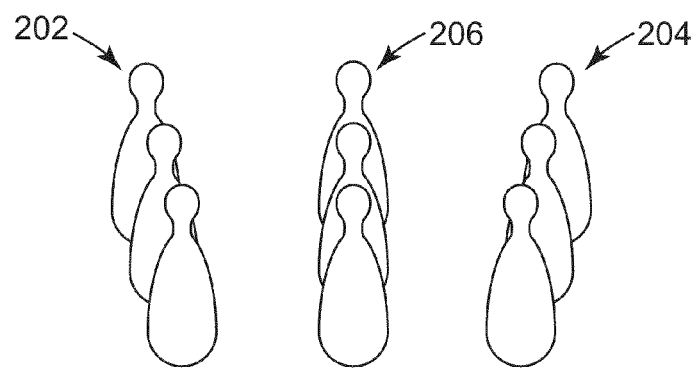
FIG. 9 is a diagram illustrating a left eye view, center view, and right eye view.

The availability of surface features by which the viewer's visual system can determine surface disparity is key to a viewer being able to effectively fuse a stereoscopic image pair. FIG. 9 is an illustration showing how due to the fact that a viewer's two eyes are located at slightly different locations in space each eye sees a slightly different view of the world. The viewer's brain is able to fuse the two images 202, 204 to form a solid perception 206 of the world to infer depth via the amount of disparity in the two views of a given surface. The inference that the viewer's visual system is making is a surface with more disparity in a scene is inferred to be closer to the viewer than surfaces with less disparity in the scene.

In fact fusing an image has been found to be significantly easier if all of the layers in a piece of stereoscopic content contain sufficient features to determine relative disparity. If a single layer in a piece of stereoscopic content lacks sufficient disparity features to determine relative disparity, it not only affects the viewer's ability to fuse that layer but also the other layers in the piece as well due to the resulting conflict in depth cues that often are partially due to the lack of sufficient surface features to accurately judge disparity. If a surface lacks sufficient surface features by which one can accurately infer disparity information, then as a result that surface has zero disparity and is perceived as being at the display level. Such phenomenon can result in a depth cue conflict if one or more depth cues suggest the layer is located at one depth plane whereas other depth cue suggests the layer is located at another depth plane.

If stereoscopic content is generated incorrectly, one depth cue may provide the viewer with one type of visual information and a second depth cue may provide a different type of visual information. For example, disparity information may indicate to the viewer that it is to be perceived in front of the bezel, whereas if the bezel itself is blocking off part of that same content a different depth cue, occlusion, may indicate to the viewer the bezel must be in front. When this condition occurs, two depth cues are in conflict and the viewer may have difficulty fusing the two images and thus fail to perceive depth in the display. Such depth cue conflict is believed to be one of the main causes of visual strain or fatigue.

The present embodiment illustrates a method of stereoscopic content generation or presentation involving physically separating the content from the display bezel so as to prevent depth cue conflict resulting from disparity/occlusion mismatch. The distance to maintain the 3D content from the bezel depends on the depth of the bezel, the maximum amount of disparity in the display, and the perceived distance of the content above the bezel, tiled surfaces, edges or any physical edges touching or immediately adjacent to the stereoscopic portion of the display. The present embodiment can apply to any stereoscopic 3D display system with a bezel in which it is possible for bezel occlusion of display content to create depth cue conflict.

For all the anaglyphs (FIGS. 10-15) described herein below, the color "red" is denoted in the figures with "hatched" fill and the color blue is denoted in the figures by a "stippling" fill.

Figure 10:
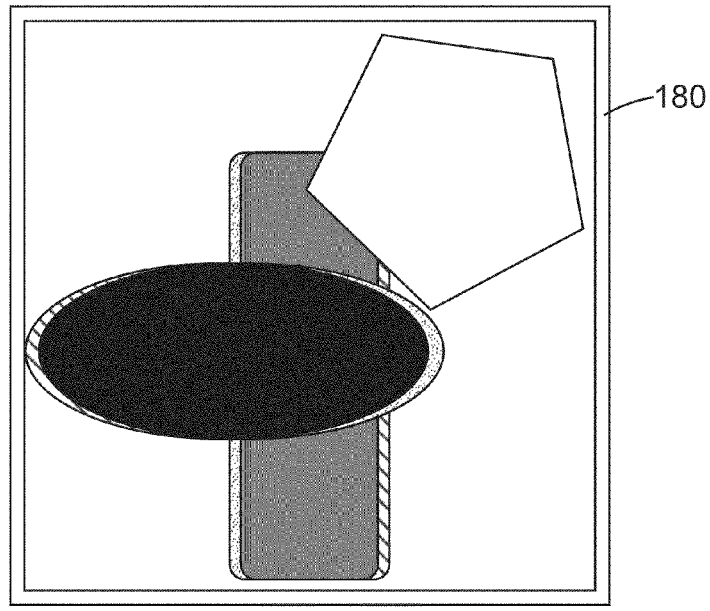
FIG. 10 is a diagram illustrating a black ellipse perceived to float above a display bezel.

FIG. 10 is a red/cyan anaglyph illustration that represents a black ellipse with disparity such that it would be perceived to float above the display bezel 180. Note that in a red/cyan anaglyph stereo image an object with red highlighted disparity to the left and cyan highlighted disparity to the right is typically perceived to project closer to the viewer, whereas an object with cyan highlighted disparity to the left and red highlighted disparity to the right is typically perceived to project away from the viewer (i.e., into the display). In the illustration in FIG. 10, the outer square frame represents the display bezel 180. In the illustration in FIG. 10, there are two definite depth cues in conflict, disparity and occlusion.

Figure 11:
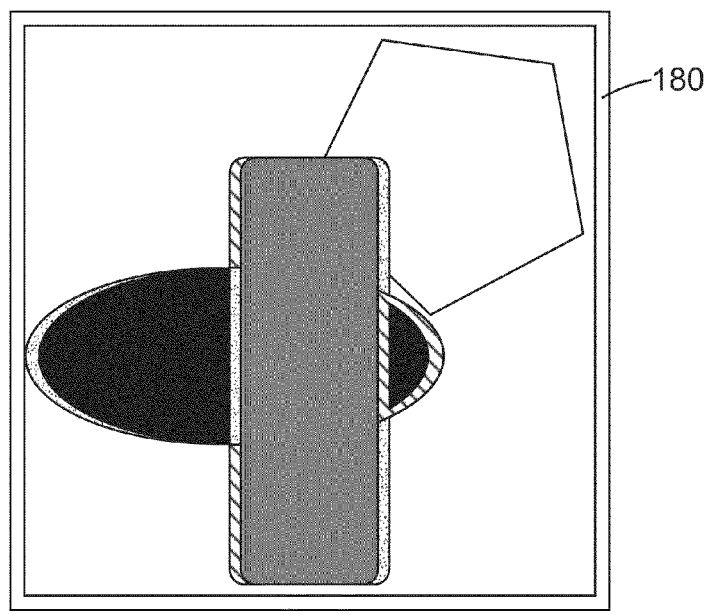
FIG. 11 is a diagram illustrating a black ellipse perceived to project behind a display bezel

FIG. 11 is a red/cyan anaglyph illustration that represents a black ellipse with disparity such that it would be perceived to project behind the display bezel 180. Note that in a red/cyan anaglyph stereo image an object with red highlighted disparity to the left and cyan highlighted disparity to the right is typically perceived to project closer to the viewer, whereas an object with cyan highlighted disparity to the left and red highlighted disparity to the right is typically perceived to project away from the viewer (i.e., into the display). In the illustration in FIG. 11, the outer square frame represents the display bezel 180. In the illustration in FIG. 11, there are no depth cues in conflict. In this example, the black ellipse is drawn so that it projects into the display behind the bezel.

Figure 12:
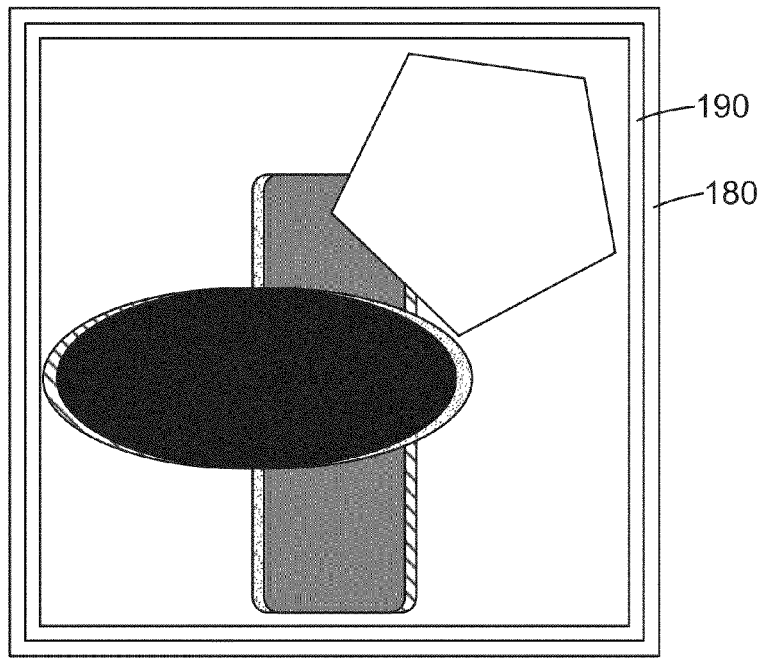
FIG. 12 is a diagram illustrating a black ellipse perceived to float above a display bezel and including a no content zone.

One particular embodiment includes a stereoscopic display where there is a no content zone directly interior to the display bezel's left and right edge and the bezel's size is defined by the maximum amount of disparity to be displayed. FIG. 12 is an illustration where the no content zone 190 is displayed in the square inside the outer square 180 (bezel).

Another particular embodiment includes stereoscopic content that dynamically determines the screen size where the presence and size of a no content zone is determined by whether the content to be displayed in that region of the screen would lead to depth cue conflict.

Figure 13:
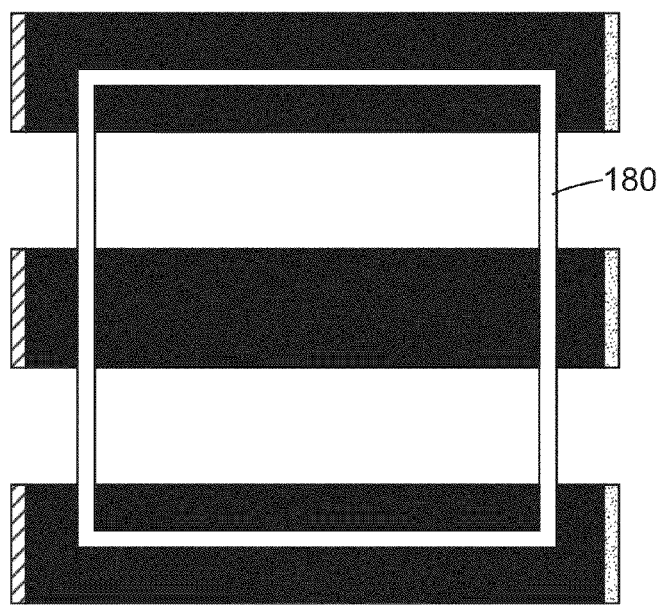
FIG. 13 is a diagram illustrating a stereoscopic display lacking sufficient features to determine relative disparity.
Figure 14:
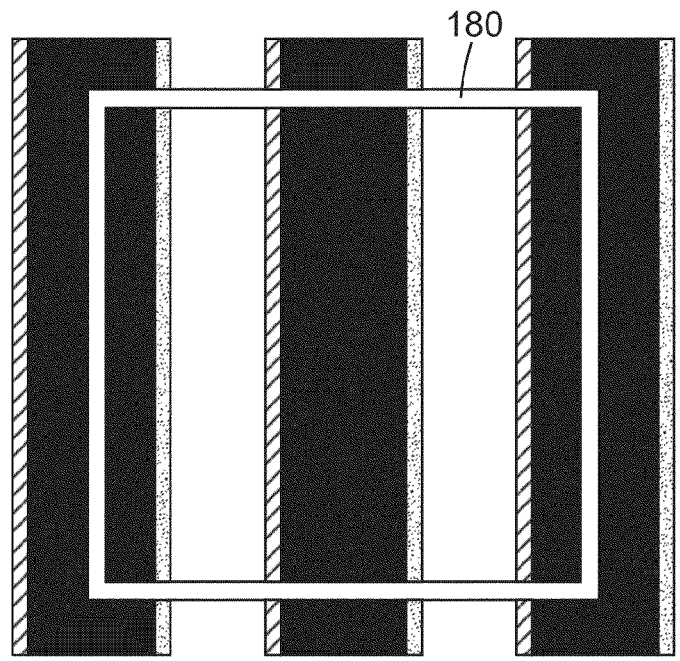
FIG. 14 is a diagram illustrating a stereoscopic display containing sufficient features to determine relative disparity.

With artificial stereoscopic content (e.g., drawn or render stereoscopic image pairs), surfaces may be generated in such a way as to lack sufficient stereoscopic disparity determining features. FIG. 13 is an example of a surface that would lack sufficient disparity features to determine relative disparity. FIG. 14 is an example of a surface that contains sufficient disparity features to determine relative disparity.

FIG. 13 is a red/cyan anaglyph illustration of a stereoscopic display where the displayed features lack sufficient disparity features to determine relative disparity. The square frame represents the display bezel 180. In the illustration in FIG. 13, the dark square represents a stereoscopic display and the horizontal black and white bars represent a single surface. Red and cyan portions on the right and left ends of the black bars, respectively, would illustrate the disparity in the two eye views. In the displayed section of the images (inside the display bezel 180) there is no disparity, thus the two eye views would be identical.

FIG. 14 is a red/cyan anaglyph illustration of a stereoscopic display where the displayed features contain sufficient disparity features to determine relative disparity. The square frame represents the display bezel 180. In the illustration in FIG. 14, the dark square represents a stereoscopic display and the vertical black and white bars represent a single surface. Red and cyan portions on the right and left sides, respectively, of each black bar would illustrate the disparity in the two eye views. In the displayed section of the images (inside the display bezel 180) there is disparity, thus the two eye views would not be identical.

Figure 15:
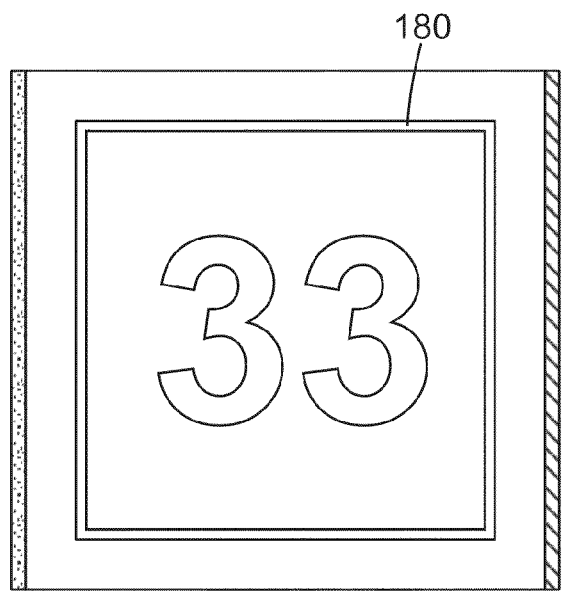
FIG. 15 is a diagram illustrating a stereoscopic display with a logo and containing sufficient features to determine relative disparity.

The features need not be noticeably or consciously discernable in order for a viewer's visual system to use them to determine relative disparity, which is illustrated in FIG. 15.

FIG. 15 is a red/cyan anaglyph illustration of a stereoscopic display where the displayed features contain sufficient disparity features to determine relative disparity. In the illustration in FIG. 15, the square 180 represents a stereoscopic display or display bezel 180. The red and cyan portions, on the right and left sides, respectively, of the gray square, would illustrate the disparity in the two eye views. In the displayed section of the images there is disparity, thus the two eye views would not be identical. In the illustration in FIG. 15, the gray of the 33 logo and the gray of the background are noticeably different (i.e., there is more than an 8% difference in brightness from one to the other); however, for a viewer's visual system to use them as a basis of judging relative disparity they need not be noticeably or perceptively different.

Another particular embodiment includes a rendering tool that assesses whether a given surface has sufficient features to judge relative disparity. Words or logo could be used as disparity feature enhancers, or patterns (e.g., sinusoidal pattern) could also be used as disparity feature enhancers. Such feature enhancers could be either consciously perceptible or only subjectively perceptible in nature.

Uniform Light Guide

An embodiment includes a display with stereoscopic 3D content in one section and 2D content in other sections, as described above for example, with a high degree of perceived uniformity and no neutral density filters. The perceived brightness or luminance uniformity of the display among all the 2D-3D-2D sections does not waste light and includes a single light guide. As used herein the phrase "uniformed perceived luminance or brightness" refers to the lack of noticeable perceived luminance change across a space (e.g., for a given display or image a photometer might measure luminance changes across a space (or across the display or image) that the average human visual system lacks the sensitivity to perceive the luminance changes.) This disclosure of uniform light guide is also applicable to any 3D display in general.

One particular embodiment includes a 2D-3D-2D display with one backlight and one LCD panel which displays 3D content only in the center section and 2D content on either side, as described above with respect to FIGS. 5-8.

As shown in FIGS. 5-8, the display construction is assembled with a backlight and LCD. The backlight includes a reflector made with a reflective film such as, for example, a film commercially available under the trade designation Enhanced Specular Reflective (ESR) film from 3M Company St. Paul, Minn., a light guide that has extraction features on the back side and a lenticular on the output surface, 3D film, and diffusers over the 3D film only covering the area where 2D visual information is displayed. The backlight is edge lit with LEDs, as described above.

The variables of the light guide are selected to balance the on-axis brightness of the 2D and 3D zones. The variables include the extractor angle and the thickness. These variables effect the rate the light is extracted from the light guide. The rate of light extraction determines the uniformity of the backlight. The rate of the extraction is selected so the amount of light extracted along the length of the light guide is within an acceptable range of perceived luminance uniformity. The rate of extraction for the light guide is very aggressive (see FIG. 16). The 3D zone is highly directional (see FIG. 18). Because the 2D zones use a diffuser; the light that emanates from this area is spread out over $2\pi$ steradians (see FIG. 17), effectively lowering the intensity of light normal to the display while improving view angle performance. Selecting a light guide with the correct rate of extraction provides for construction of a backlight with the same intensity or brightness normal to the display in the 3D zone as well as in the flanking 2D zones. The correct rate of extraction is enough to make the on-axis brightness of the 2D zone about the same as the 3D zone with acceptable uniformity in the 2D zone and acceptable uniformity in the 3D zone. This brightness and uniformity is accomplished without neutral density filters so as to minimize the light loss and effectively provide a highly efficient backlight.

Figure 16:
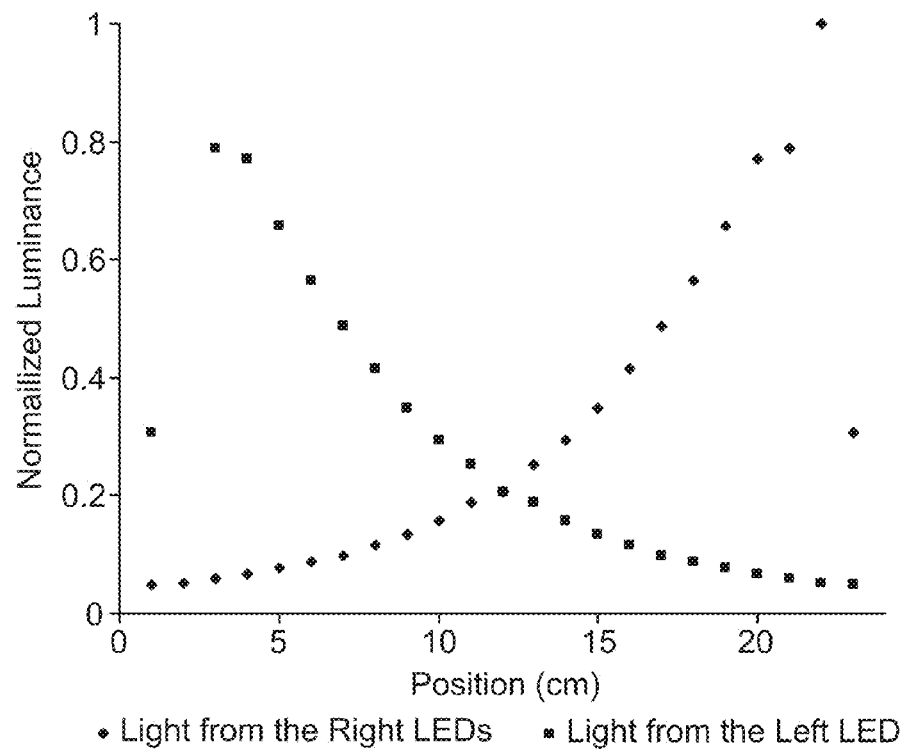
FIG. 16 is a graph of maximum light intensity or luminance through a 3D film.

FIG. 16 illustrates the maximum intensity or luminance through the 3D film plotted to show the highly nonuniform backlight before the diffusers were place over the 2D areas. The total width of the light guide was 230 mm and has about a 10:1 uniformity. The effective 3D area was 75 mm wide centered and had 5:3 uniformity.

Figure 17:
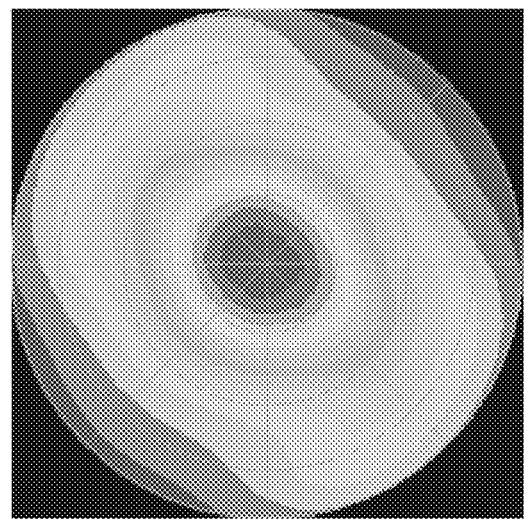
FIG. 17 is an angular plot of light intensity or luminance of a 2D area of a 3D-2D display.

FIG. 17 is an angular plot of the light intensity or luminance for 2D area of the display through the LCD panel. This plot shows that with diffusers the light from the 3D film is spread over greater viewing angles.

Figure 18:
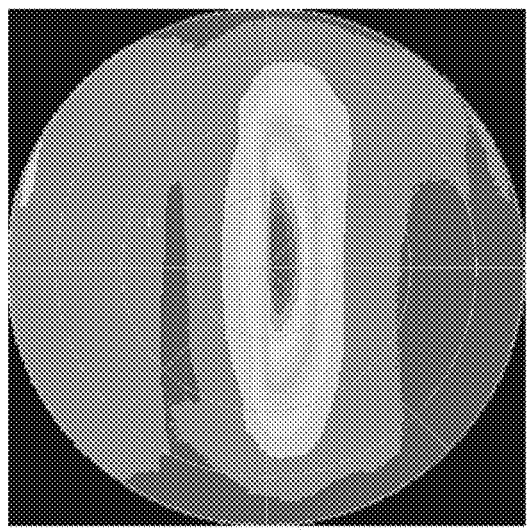
FIG. 18 is an angular plot of light intensity or luminance of a 3D area of a 3D-2D display.

FIG. 18 is an angular plot of the light intensity or luminance for 3D area of the display through the LCD panel. This plot was generated within the 3D portion of the display with the right LEDs on. The highly directional backlight is directing the light towards the viewer's right eye.

Figure 19:
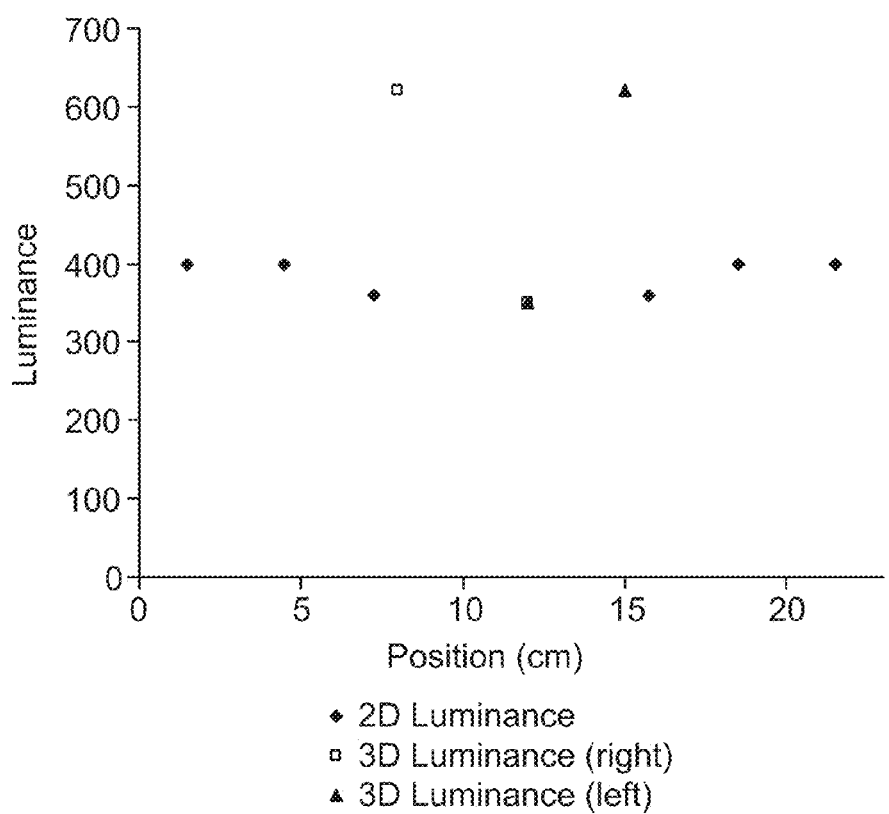
FIG. 19 is a graph of brightness or luminance measurements of a 3D-2D display with an embedded film stack.

The final on-axis brightness or luminance of the 2D-3D-2D display was measured and recorded (see FIG. 19). This graph shows that an embedded 3D-2D display can be constructed with one lightguide and no neutral density filters which improve the light guide efficacy.

FIG. 19 is a graph illustrating the final brightness or luminance measurements of the embedded display, which has 10:9 uniformity in the 2D sections and 5:3 uniformity in the 3D sections. This display was found to have acceptable perceived brightness or luminance uniformity.

Figure 20:
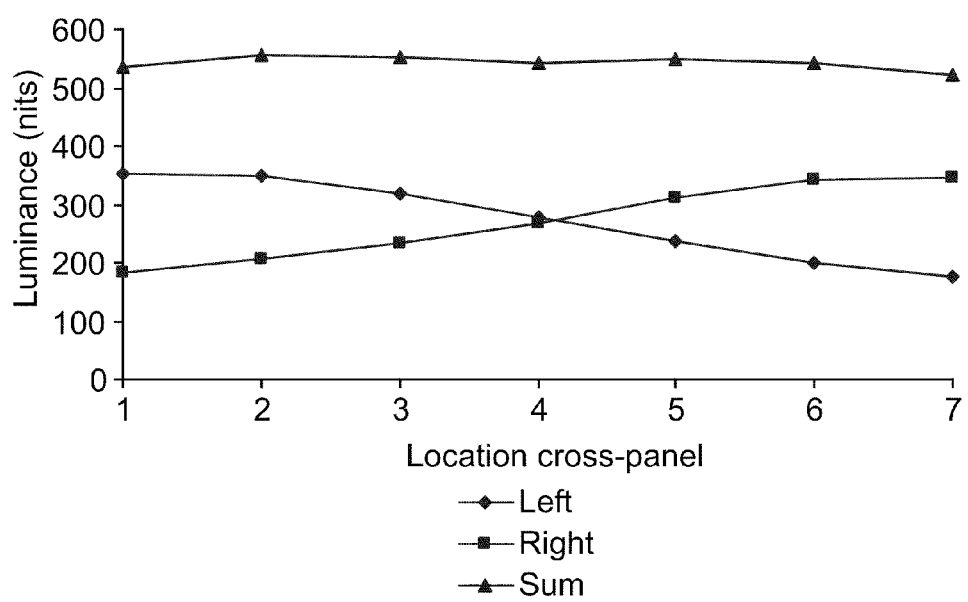
FIG. 20 is a graph illustrating the brightness or luminance measurements of a 3D display.

FIG. 20 is a graph illustrating the final brightness or luminance measurements of a 3D display where the perceived luminance uniformity is the Sum line which has a better than 10:9 uniformity, while measurement of the Right or Left each have a 2:1 uniformity. However, a viewer perceives the 3D image as a fused or summed Sum image of both the Right and Left. This display was found to have acceptable perceived brightness or luminance uniformity.

Thus, embodiments of the EMBEDDED STEREOSCOPIC 3D DISPLAY AND 2D DISPLAY FILM STACK are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A stereoscopic 3D display and 2D display, comprising:
a liquid crystal display panel;
drive electronics configured to drive the liquid crystal display panel with alternating left eye and right eye images;
a light guide and a backlight positioned to provide light to the liquid crystal display;
a double sided prism film positioned between the liquid crystal display panel and the light guide; and
a light diffusing film disposed between only a portion of the double sided prism film and the liquid crystal display panel,
wherein the display includes a 3D section providing for visual information in a 3D format and a 2D section providing for visual information in a 2D format.

2. The display of claim 1, further including a frame between the liquid crystal display panel and the light guide, wherein the frame includes a barrier between the 3D section and the 2D section.

3. The display of claim 2, wherein the frame includes two or more sections, wherein a first section corresponds with the 3D section and a second section corresponds with the 2D section.

4. The display of claim 3, wherein the diffuser contacts the frame and covers the first section that corresponds with the 2D sections and the diffuser film does not cover the second 3D section.

5. The display of claim 2, wherein the barrier comprises a tapered wedge profile having a narrow end directed toward the liquid crystal display panel and a wide end directed toward the double sided prism film.

6. The display of claim 1, wherein the diffusing film separates the liquid crystal display panel from the double sided prism film.

7. The display of claim 1, wherein the liquid crystal display panel is coextensive with the double sided prism film.

8. The display of claim 1, wherein the backlight comprises a first plurality of LEDs on a first side of the light guide and a second plurality of LEDs on a second side of the light guide opposite the first side.

9. The display of claim 1, further comprising a reflector on a surface of the light guide opposite the liquid crystal display panel.

* * * * *